(12) United States Patent
Kardel et al.

(10) Patent No.: US 8,136,842 B2
(45) Date of Patent: Mar. 20, 2012

(54) DIVERTER FOR THE SEATBELT SYSTEM OF A MOTOR VEHICLE

(75) Inventors: Arno Kardel, Glückstadt (DE); Knut Janzen, Brokstedt (DE)

(73) Assignee: Autoliv Development AB, Vargarda (SE)

( * ) Notice: Subject to any disclaimer, the term of this patent is extended or adjusted under 35 U.S.C. 154(b) by 111 days.

(21) Appl. No.: 12/679,978

(22) PCT Filed: Oct. 7, 2008

(86) PCT No.: PCT/EP2008/008440
§ 371 (c)(1),
(2), (4) Date: Mar. 25, 2010

(87) PCT Pub. No.: WO2009/046958
PCT Pub. Date: Apr. 16, 2009

(65) Prior Publication Data
US 2010/0207373 A1 Aug. 19, 2010

(30) Foreign Application Priority Data

Oct. 8, 2007 (DE) .......................... 10 2007 048 225

(51) Int. Cl.
*B60R 22/00* (2006.01)
(52) U.S. Cl. ...................... 280/808; 280/801.1; 297/483
(58) Field of Classification Search ............... 280/801.1, 280/801.2, 805, 807, 808; 297/468, 470–472, 297/474, 482, 483
See application file for complete search history.

(56) References Cited

U.S. PATENT DOCUMENTS

| 4,579,368 A | * | 4/1986 | Kawade et al. | ............. 280/801.2 |
| 4,955,639 A | * | 9/1990 | Yamamoto | ..................... 280/808 |
| 5,601,311 A | * | 2/1997 | Pfeiffer et al. | ............. 280/801.1 |
| 5,732,974 A | | 3/1998 | Sayles | |

(Continued)

FOREIGN PATENT DOCUMENTS

DE 103 39 563 A1 4/2005

(Continued)

OTHER PUBLICATIONS

PCT/EP2008/008440—International Search Report—May 14, 2009.

*Primary Examiner* — Paul N Dickson
*Assistant Examiner* — Laura Freedman
(74) *Attorney, Agent, or Firm* — Brinks Hofer Gilson & Lione

(57) ABSTRACT

A deflector for a safety belt system of a motor vehicle with a metal core, which has a mounting aperture in the upper section (12) and a belt loop in the lower section, and a plastic element that encompasses at least some sections of the metal core. The plastic element having a first section (30), which is fixed on the metal core, and a second section (50) connected to the first section (30) by means of a film hinge (60), which in the fully assembled state covers at least the front side of the upper section (12) of the metal core and engages with the first section. In order to reliably prevent the second section (50) from becoming detached from the first section (30) in case an expanding curtain airbag makes impact on the second section, one of the two sections of the plastic element has a nose (40) with a first contact surface beside the film hinge, which in the fully assembled state is in contact with a second contact surface of the other section.

7 Claims, 5 Drawing Sheets

U.S. PATENT DOCUMENTS

| | | | | |
|---|---|---|---|---|
| 5,863,071 A | * | 1/1999 | Li-Calso | 280/801.1 |
| 6,007,100 A | * | 12/1999 | Steffens, Jr. | 280/801.1 |
| 6,033,030 A | * | 3/2000 | Valasin | 297/483 |
| 6,273,469 B1 | * | 8/2001 | Kwaske et al. | 280/805 |
| 6,702,327 B2 | * | 3/2004 | Janz | 280/808 |
| 6,929,286 B2 | * | 8/2005 | Bertelle et al. | 280/808 |
| 7,597,359 B2 | * | 10/2009 | Gray | 280/808 |
| 2005/0017498 A1 | * | 1/2005 | Kang | 280/808 |
| 2007/0001444 A1 | * | 1/2007 | Smith et al. | 280/808 |

FOREIGN PATENT DOCUMENTS

| | | |
|---|---|---|
| DE | 10 2006 043 780 A1 | 8/2007 |
| WO | WO 2005021338 A1 * | 3/2005 |

* cited by examiner

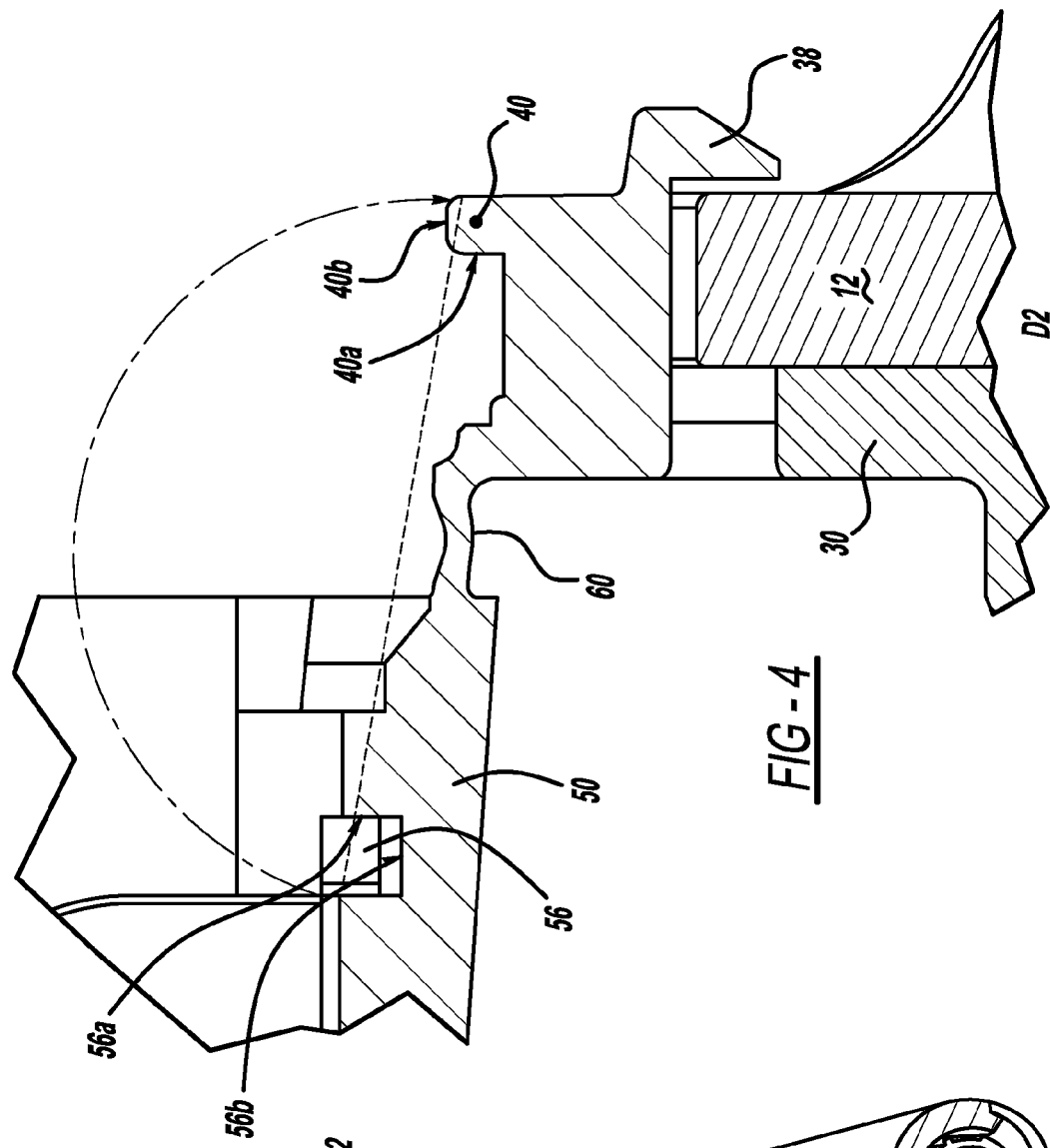
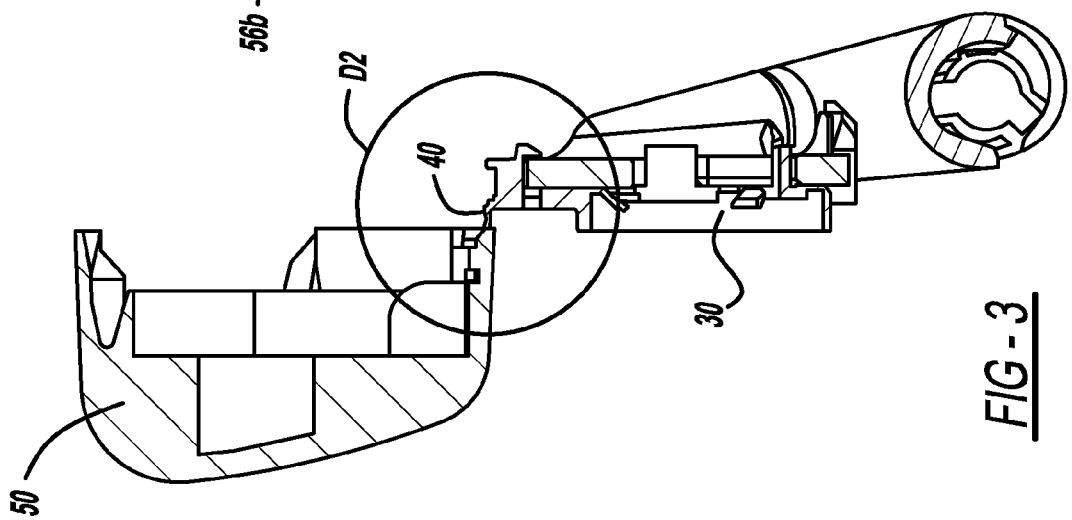

DIVERTER FOR THE SEATBELT SYSTEM OF A MOTOR VEHICLE

CROSS REFERENCE TO RELATED APPLICATIONS

This application claims priority to German Patent Application No. 10 2007 048 225.8, filed Oct. 8, 2007 and PCT patent application PCT/EP2008/008440 filed Oct. 7, 2008.

FIELD OF THE INVENTION

The invention concerns a deflector for the safety belt system of a motor vehicle.

BACKGROUND OF THE INVENTION

Most safety belt systems in motor vehicles have a retractor, which is mounted on the motor vehicle below the shoulder height of the passenger to be protected, for example, in the area of the floor of the vehicle. Because of this, it is necessary to provide a deflector (or guide loop) for the belt strap above the height of the passenger's shoulder. Due to the large forces that can occur in the case of an accident, the support structure of such a deflector must always be made of metal, namely steel. A deflector of this type has an upper section with a mounting aperture and a lower section with a belt loop, wherein in the assembled state, a mounting element, generally in the form of a screw, extends through the mounting aperture and the belt strap extends through the belt loop.

Deflectors consisting of a metal core and a plastic element that encompasses some sections of the metal core are known. The plastic element may be an injection molded part produced as one piece with two sections connected to each other by means of a film hinge, that is, by means of a thin and flexible plastic section. A first section of the plastic element is fixed herein directly on the metal core and the second section covers at least the front side of the upper section of the metal core in the fully assembled state. The second section can perform two functions. On the one hand, it covers the upper section of the metal core, and in particular also the head of the mounting screw, which contributes to the safety of the passenger, since any potential impact of the head against the second section made of plastic is considerably less dangerous in any case than an impact against the screw head or the metal core. The second section can also serve to limit the height and width of the belt loop. It is possible in particular to obtain different geometries of the belt loop with the same metal core by utilizing different plastic elements, so that the plastic element serves as adapter.

In the assembled state, the first and second sections of the plastic element are connected to each other as follows: The connection takes place essentially at the uppermost point of the deflector by means of the already mentioned film hinge, and locking elements are provided in the area of the upper edge of the belt loop, by means of which the second section is fixed on the first section. The position of the second section with reference to the first section is thus fully statically defined and the connection is sufficiently stable during normal operation.

The preassembly and final assembly of such a deflector is very easy. During preassembly, the first section of the plastic element is fixed on the metal core. During final assembly, the metal core is first fixedly screwed to the interior structure of the motor vehicle and the second section of the plastic element is then pivoted and engages with the first section.

It has been shown that, in particular when a side curtain airbag is available as an additional protective system in the motor vehicle, the connection between the first and second section of the plastic element cannot be sufficiently stable under unfavorable conditions. If the expanding curtain airbag makes impact at an unfavorable angle against the second section of the plastic element, then the film hinge can tear, whereby the locking elements also lose their counteracting force and the second section becomes detached from the deflector. This is unfavorable from two points of view. On the one hand, the second section can reach quite a high speed during tearing, which is undesireable. On the other hand, the head of the mounting screw is then free, which is precisely what was to be prevented by means of providing the second section of the plastic element.

Based on this, the problem of the invention is to improve a generic deflector in such a way that a tearing of the second section of the plastic element is also reliably prevented under unfavorable circumstances without the need to increase the production or assembly expenditure for the deflector.

SUMMARY OF THE INVENTION

According to the invention, a nose with a first contact surface, which is in contact with a second contact surface of the other section in the assembled state, is arranged beside a film hinge on one of the two sections of the plastic element. Forces that would be transmitted exclusively through the thin film hinge if the nose and the corresponding second contact surface were not in place are absorbed by the nose, so that the film hinge is relieved of these forces in the ideal case. Since the nose does not have to be movable in contrast to the film hinge, it can be dimensioned correspondingly thick, so that it is practically completely rigid. This means that the nose does not become significantly deformed even if large forces are applied, so that a deflection of the film hinge beyond its breaking point is precluded.

The plastic element can also be produced as one piece in an injection molding process such as in the prior art, so that no additional expenditure is required with regard to its production. The assembly does not differ from the prior art with respect to a deflector, so that here also there is no additional expenditure.

A particularly effective force deflection is obtained if the first contact surface extends essentially parallel to the upper section of the metal core, so that the first contact surface faces toward the film hinge in the closed state.

Further preferred embodiments are obtained from the claims, as well as from the exemplary embodiment described with reference to the figures, wherein:

BRIEF DESCRIPTION OF THE DRAWINGS

FIG. 3 shows a section along the plane E of FIG. 1;

FIG. 4 shows the detail D2 of FIG. 3;

DESCRIPTION OF THE PREFERRED EMBODIMENTS OF THE INVENTION

Figure 1:
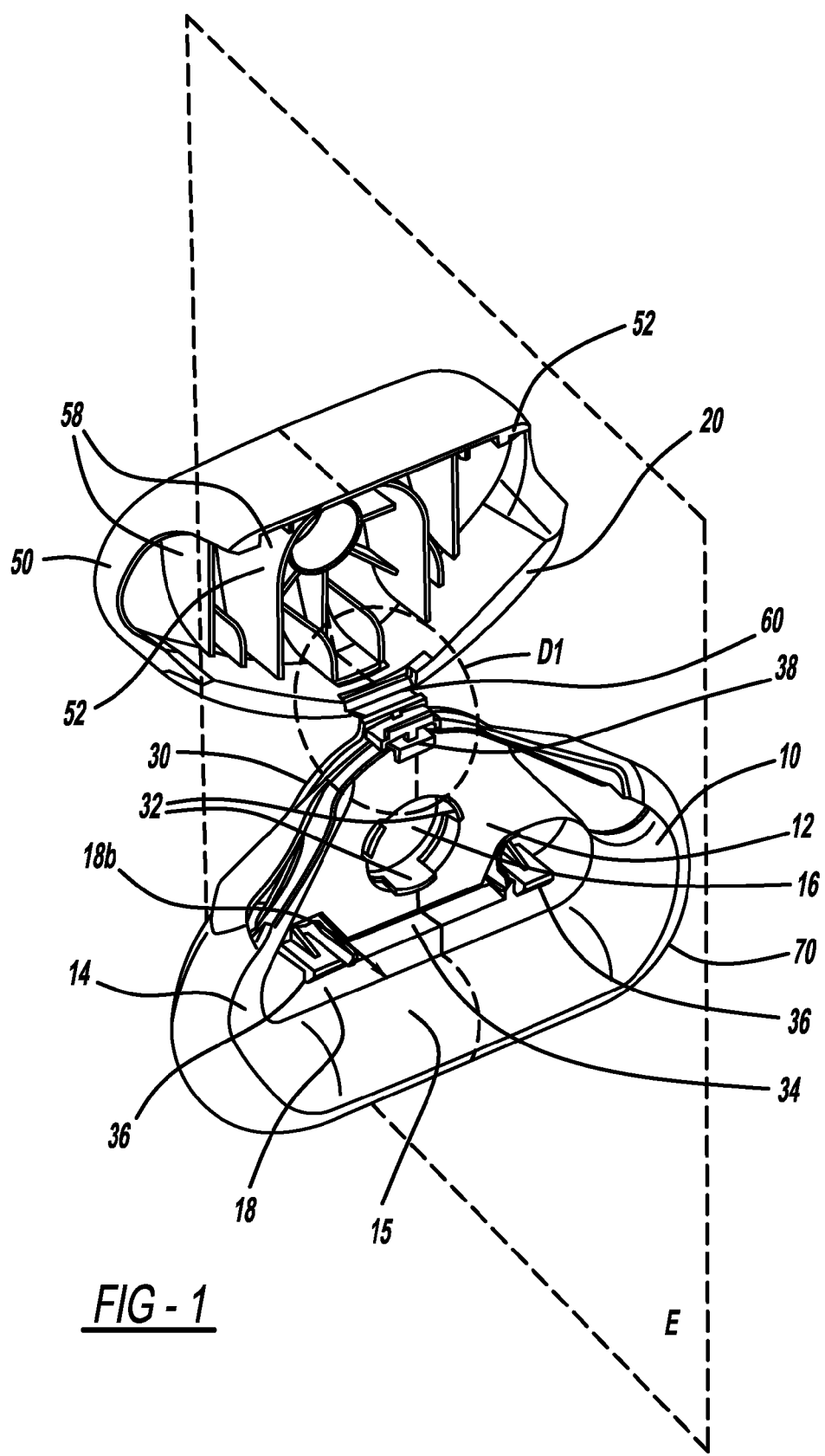
FIG. 1 shows a perspective view of a complete deflector in accordance with this invention, wherein the second section of the plastic element is not yet fixed on the first section.

FIG. 1 shows a deflector in the still not fully assembled state. The deflector consists of a metal core 10, a plastic element 20, and a further plastic element 70. The metal core 10 has an upper section 12 with a mounting aperture 16 and a lower section 14 with a belt loop 18. The belt loop 18 is delimited on the bottom by means of a flexing beam 15, which has a convex surface (lower edge 18b). The metal core 10 is molded as one piece of steel and is often coated.

The plastic element 20 consists of two sections, namely the first section 30 and the second section 50. The first section 30 is fixed directly on the metal core 10, for which purpose it is provided with several locking means. An upper locking hook 38 arranged on a land 31 positioned vertical with respect to the upper section 12 of the metal core 10 encompasses the upper edge of the upper section 12 of the metal core 10. The first section 30 is centered with respect to the mounting apertures 16 by means of fingers 32.

A film (or "living") hinge 60, which is connected in turn to the second section 50, extends from the uppermost point of the first section 30 of the plastic element 20. The first section 30, film hinge 60, and second section 50 are configured as an integral injection molded part and form the plastic element 20. The second section 50 forms a kind of cap, which is internally reinforced by reinforcing ribs 58.

The first section 30 has lower locking hooks 36 and the second section 50 has lower locking sections 52. If the second section 50 is pivoted onto the first section 30, the lower locking hooks 36 fix the lower locking sections 52, so that the two sections are fixedly connected to each other.

The exemplary embodiment shown herein is provided with another plastic element 70 which essentially encompasses the boundary area of the metal core.

Figure 2:
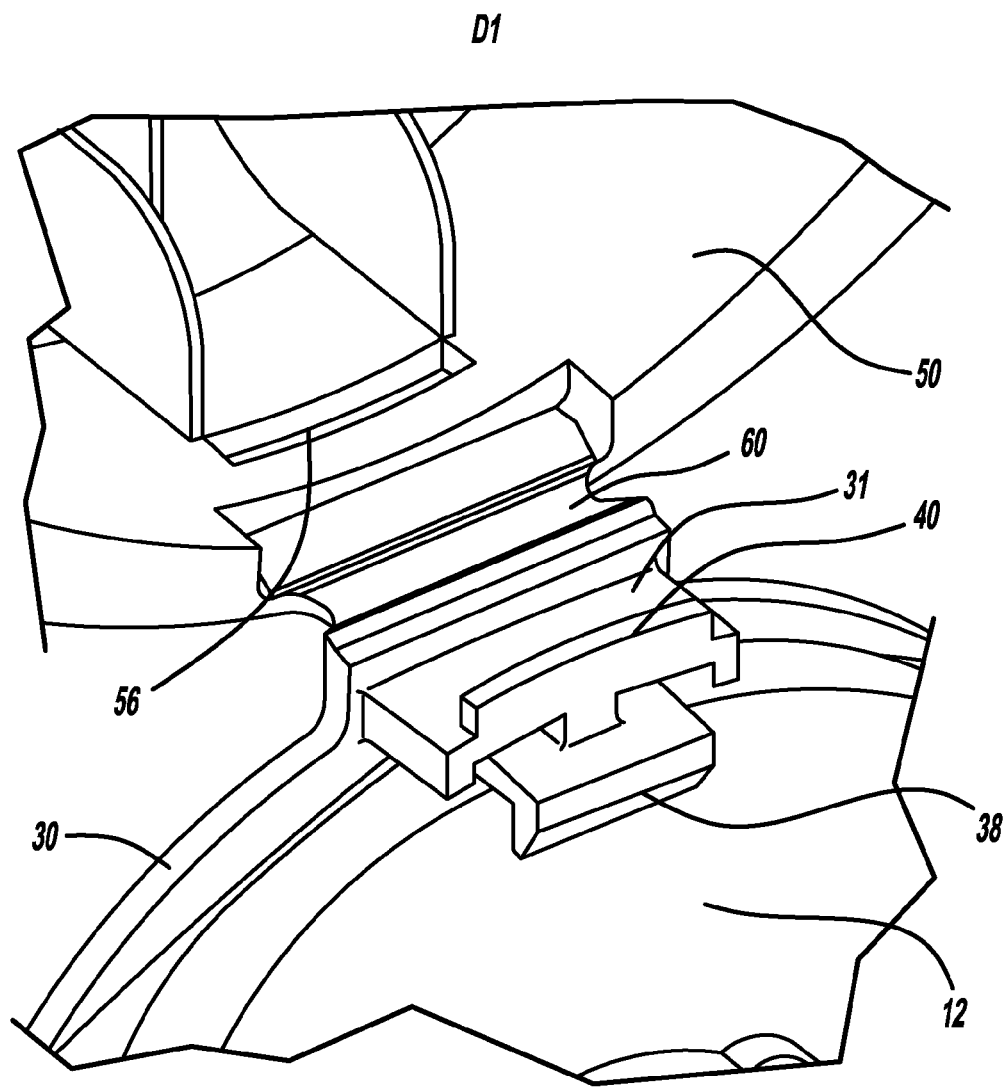
FIG. 2 shows the detail D1 of FIG. 1.

FIG. 2, which illustrates the detail D1 of FIG. 1, shows a three-dimensional view of the improvement of the deflector according to the invention. A nose 40 extends upward from the land 31 of the first section of the plastic element 20 directly beside the film hinge 60, that is, essentially parallel to the directly adjacent upper section 12 of the metal core 10. The second section 50 of the plastic element 20 has a recess 56 configured in essentially complimentary shape, in which the nose 40 comes to rest when the second section 50 is pivoted onto the first section 30, as is shown in further detail in the following figures. The width of the recess 56 is somewhat greater than the width of the nose 40, so that a pivoting of the second section 50 onto the first section 30 is possible without interference.

FIG. 3 shows the situation of FIGS. 1 and 2, but in cross sectional representation along the plane E of FIG. 1. FIG. 4 illustrates the detail D2 of FIG. 3. It can be seen particularly well in FIG. 4 that the nose 40 comes to rest in the recess 56 when the section 50 is pivoted onto the first section 30. The first contact surface 40a of the nose 40 and the second contact surface 56a of the recess 56, as well as the third contact surface 40b of the nose 40 and the fourth contact surface 56b of the recess are in mutual contact herein.

Figure 5:
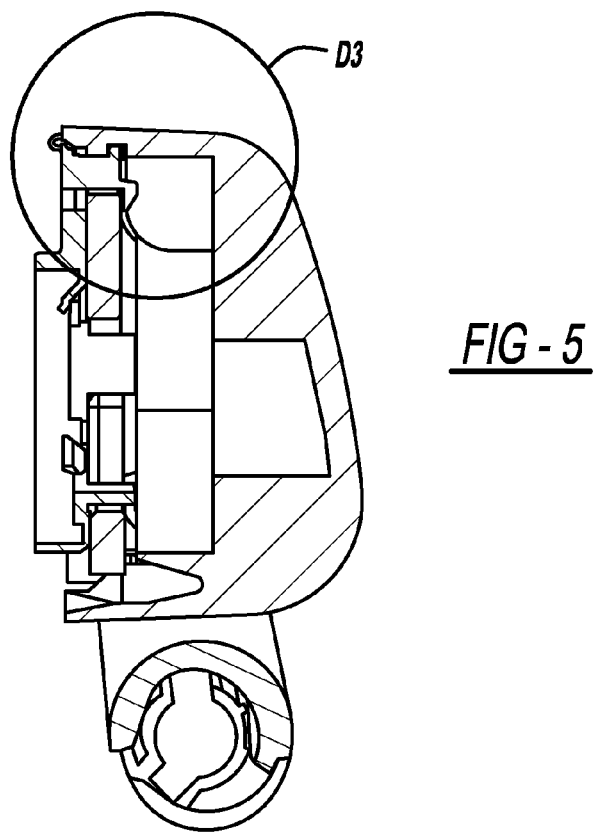
FIG. 5 shows the state presented in FIG. 3, when the second section of the plastic element is fixed on the first section.
Figure 6:
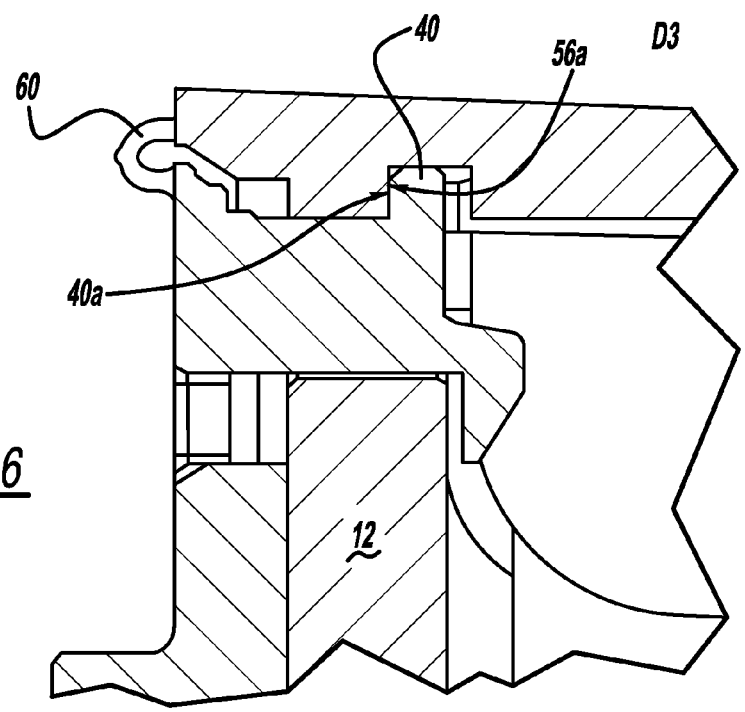
FIG. 6 shows the detail D3 of FIG. 5.

FIGS. 5 and 6 show the pivoted state, wherein the contact surfaces allocated to each other are in mutual contact. Small gaps can also be tolerated herein between the allocated contact surfaces. It can also be seen well in FIG. 6 that the two contact surfaces 40a and 56a extend essentially parallel to the upper section 12 of the metal core 10, and that the first contact surface 40a of the nose 40 faces toward the direction of the film hinge 60. The third and fourth contact surfaces 40b and 56b are vertical thereto.

Figure 7:
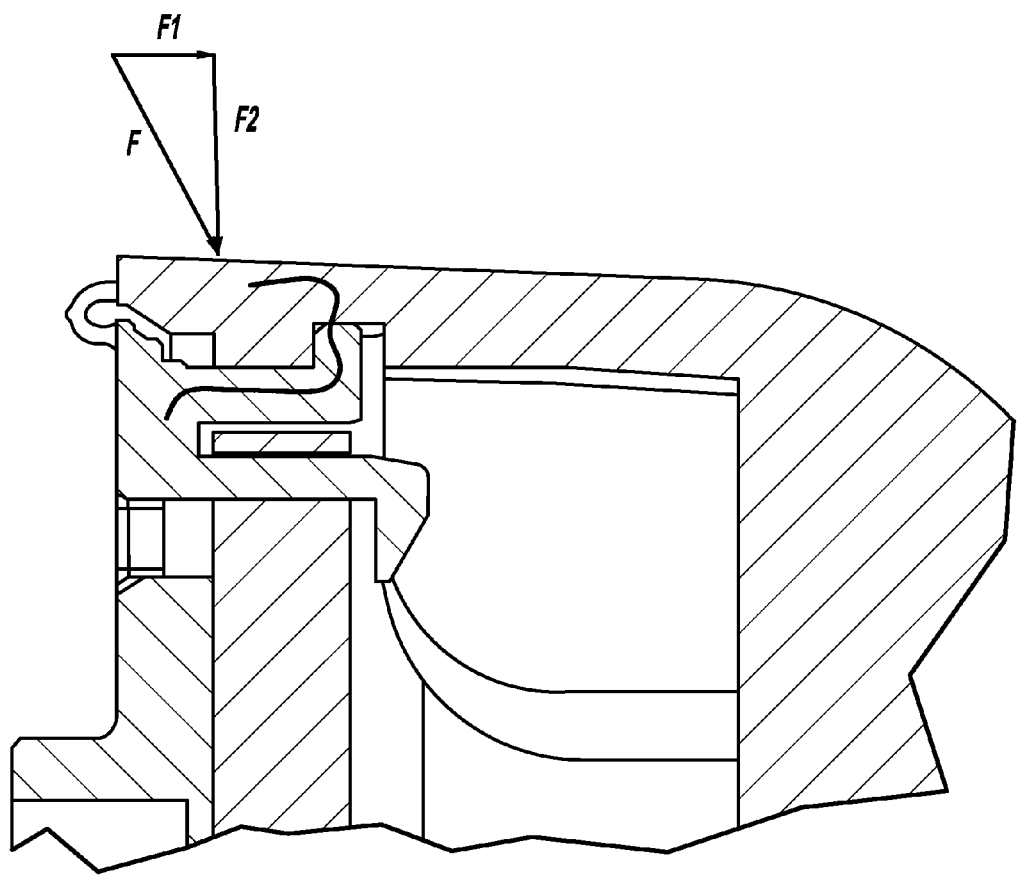
FIG. 7 shows the force flow through the nose, when an expanding curtain airbag makes impact on the deflector in a representation corresponding to that of FIG. 6.

The object and mode of operation of the improvement according to the invention become clear as shown in FIG. 7. If a curtain airbag makes impact against the second section 50 of the plastic element 20 as it expands in direction F, then a partial force F1 acts also on the second section 50, which tends to push the latter against the first section 30. This partial force F1 presses the two contact surfaces 40a and 56a toward each other, but while the rigid nose 40 prevents a movement of the second section 50 in direction F1. A displacement of the second section 50 is in any case as large as the gap that may exist between the first and second contact surfaces 40a and 56a. A movement in direction F2 is also precluded, since at least the third and fourth contact surfaces 40b, 56b, which are in contact with one another, are in place vertically with respect to the two first contact surfaces. No forces act in this way on the film hinge 60, since these are exclusively deflected via the nose 40, whereby a detachment of the second section 50 from the first section 30 is reliably prevented.

While the above description constitutes the preferred embodiment of the present invention, it will be appreciated that the invention is susceptible to modification, variation and change without departing from the proper scope and fair meaning of the accompanying claims.

The invention claimed is:

1. A deflector for the a safety belt system of a motor vehicle comprising a metal core, which has a mounting aperture in an upper section thereof and a belt loop in the a lower section thereof, and a plastic element that encompasses at least some sections of the metal core, the plastic element having a first section, which is fixed on the metal core, and a second section connected to the first section by a film hinge, which in the fully assembled state of the first and second sections, the second section covers at least the front side of the upper section of the metal core and engages with the first section, wherein the first section of the plastic element has a nose between the film hinge and the mounting aperture with a first contact surface facing in a direction toward the film hinge, which in the fully assembled state is in contact with a second contact surface of the second section.

2. The deflector of claim 1, further comprising that the second contact surface is part of a recess.

3. The deflector of claim 1, further comprising that the first contact surface extends essentially parallel to the upper section of the metal core.

4. The deflector of claim 1, further comprising that a locking hook (38), which encompasses the metal core, extends from the base of the nose.

5. The deflector of claim 1 further comprising that the first and second sections (30, 50) of the plastic element (20) mutually engage in the area of the upper edge of the belt loop (18).

6. The deflector of claim 1, further comprising that the plastic element is produced as one piece in an injection molding process.

7. The deflector of claim 1, further comprising that third and fourth a third and a fourth contact surfaces (40b, 56b) are provided and are in mutual contact in the fully assembled state and are positioned essentially perpendicular to the first and second contact surfaces (40a, 56a).

* * * * *